(12) United States Patent
Gledhill et al.

(10) Patent No.: US 10,105,826 B2
(45) Date of Patent: Oct. 23, 2018

(54) METHODS OF MAKING POLYCRYSTALLINE DIAMOND BODIES HAVING ANNULAR REGIONS WITH DIFFERING CHARACTERISTICS

(71) Applicant: DIAMOND INNOVATIONS, INC., Worthington, OH (US)

(72) Inventors: Andrew Gledhill, Westerville, OH (US); Christopher Long, Westerville, OH (US); Alexanne Johnson, Columbus, OH (US); Joseph Rhodes, Heath, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 0 days.

(21) Appl. No.: 15/460,404

(22) Filed: Mar. 16, 2017

(65) Prior Publication Data

US 2017/0266783 A1    Sep. 21, 2017

Related U.S. Application Data

(60) Provisional application No. 62/309,073, filed on Mar. 16, 2016.

(51) Int. Cl.
| | |
|---|---|
| *B24D 3/02* | (2006.01) |
| *C09C 1/68* | (2006.01) |
| *C09K 3/14* | (2006.01) |
| *B24D 18/00* | (2006.01) |
| *E21B 10/567* | (2006.01) |
| *B22F 3/14* | (2006.01) |

(Continued)

(52) U.S. Cl.
CPC ............ *B24D 18/0009* (2013.01); *B22F 3/14* (2013.01); *B30B 11/004* (2013.01); *B30B 15/30* (2013.01); *C04B 35/528* (2013.01); *C22C 1/05* (2013.01); *C22C 1/10* (2013.01); *C22C 26/00* (2013.01); *E21B 10/567* (2013.01); *E21B 10/5676* (2013.01); *B22F 2005/001* (2013.01); *B22F 2202/17* (2013.01); *C04B 2235/427* (2013.01); *C04B 2235/775* (2013.01); *C22C 2204/00* (2013.01); *E21B 10/54* (2013.01)

(58) Field of Classification Search
None
See application file for complete search history.

(56) References Cited

U.S. PATENT DOCUMENTS

| | | |
|---|---|---|
| 6,187,068 B1 | 2/2001 | Frushour et al. |
| 6,408,959 B2 | 6/2002 | Bertagnolli |

(Continued)

FOREIGN PATENT DOCUMENTS

WO    2015101638 A1    7/2015

*Primary Examiner* — Colleen P Dunn
*Assistant Examiner* — Ross J Christie

(57) ABSTRACT

Polycrystalline diamond bodies having an annular region of diamond grains and a core region of diamond grains and methods of making the same are disclosed. In one embodiment, a polycrystalline diamond body includes an annular region of inter-bonded diamond grains having a first characteristic property and a core region of inter-bonded diamond grains bonded to the annular region and having a second characteristic property that differs from the first characteristic property. The annular region decreases in thickness from a perimeter surface of the polycrystalline diamond body towards a centerline axis.

15 Claims, 7 Drawing Sheets

(51) Int. Cl.
*B30B 11/00* (2006.01)
*B30B 15/30* (2006.01)
*C04B 35/528* (2006.01)
*C22C 1/05* (2006.01)
*C22C 1/10* (2006.01)
*C22C 26/00* (2006.01)
*E21B 10/54* (2006.01)
*B22F 5/00* (2006.01)

(56) References Cited

U.S. PATENT DOCUMENTS

| | | |
|---|---|---|
| 8,590,643 B2 | 11/2013 | Smallman |
| 9,017,438 B1 * | 4/2015 | Miess ................... B24D 3/06 51/293 |
| 2011/0031033 A1 | 2/2011 | Mourik |
| 2012/0241225 A1 | 9/2012 | Briggs |
| 2014/0116789 A1 | 5/2014 | Sue |
| 2014/0318027 A1 | 10/2014 | Sani |
| 2015/0114725 A1 | 4/2015 | Alkhalaileh |
| 2015/0211306 A1 * | 7/2015 | Mukhopadhyay .... E21B 10/567 175/428 |
| 2015/0283618 A1 | 10/2015 | Digiovanni |

\* cited by examiner

METHODS OF MAKING POLYCRYSTALLINE DIAMOND BODIES HAVING ANNULAR REGIONS WITH DIFFERING CHARACTERISTICS

CROSS-REFERENCE TO RELATED APPLICATIONS

None.

TECHNICAL FIELD AND INDUSTRIAL APPLICABILITY

The present disclosure relates generally to polycrystalline diamond bodies and compacts including the same and, more particularly, to polycrystalline diamond bodies having annular regions with differing characteristics than the remaining regions, and methods of making the same.

BACKGROUND

PCD compacts typically include a superabrasive diamond layer, referred to as a polycrystalline diamond body that is attached to a substrate. The polycrystalline diamond body may be formed in a high pressure high temperature (HPHT) process, in which diamond grains are held at pressures and temperatures at which the diamond particles bond to one another.

It is conventionally known to incorporate uniform or nearly-uniform properties across the PCD body, for example, by incorporating uniform or nearly-uniform constituent materials throughout the PCD body. However, such PCD bodies may exhibit improved abrasion, thermal stability, and/or toughness when materials having different properties are introduced to the PCD bodies.

Accordingly, PCD bodies and compacts and compacts incorporating the same may be desired.

SUMMARY

In one embodiment, a polycrystalline diamond body includes a working surface, an interface surface, and a perimeter surface. The polycrystalline diamond body also includes an annular region of inter-bonded diamond grains that extends away from at least a portion of the working surface and at least a portion of the perimeter surface, where the annular region comprises diamond grains having a first characteristic property. The polycrystalline diamond body further includes a core region of inter-bonded diamond grains bonded to the annular region and that extends away from the interface surface, and at least a portion of the core region is positioned radially inward from the annular region, where the core region comprises diamond grains having a second characteristic property that differs from the first characteristic property. The annular region decreases in thickness from the perimeter surface towards a centerline axis of the polycrystalline diamond body.

In another embodiment, a polycrystalline diamond body includes a working surface, an interface surface, and a perimeter surface. The polycrystalline diamond body also includes an annular region of inter-bonded diamond grains that extends away from at least a portion of the working surface and at least a portion of the perimeter surface, where the annular region comprises diamond grains having a first particle size distribution. The polycrystalline diamond body further includes a core region of inter-bonded diamond grains bonded to the annular region and that extends away from the interface surface, and at least a portion of the core region is positioned radially inwardly from the annular region, where the core region comprises diamond grains having a second particle size distribution that differs from the first particle size distribution.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
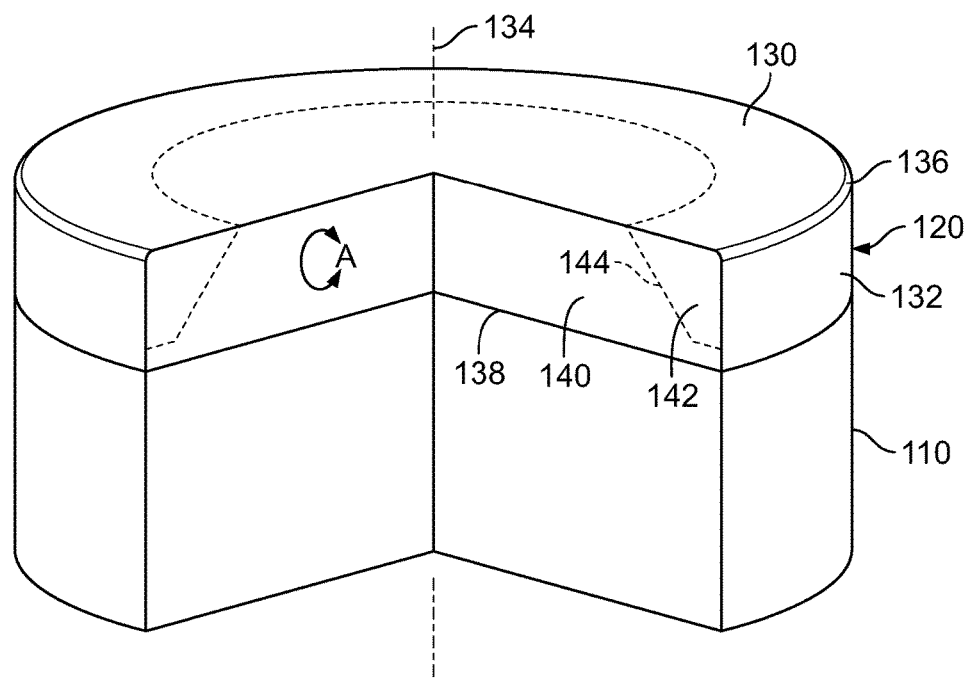
FIG. 1 is a schematic side perspective cross-sectional view of a PCD compact according to one or more embodiments shown or described herein.

The present disclosure is directed to PCD bodies, compacts, cutters, and drill bits incorporating the same. The PCD bodies include a working surface, an interface surface, and a perimeter surface. The PCD bodies include an annular region of inter-bonded diamond grain that extends away from at least a portion of the working surface and at least a portion of the perimeter surface, and a core region of inter-bonded diamond grains that are bonded to the annular region and that extends away from interface surface. The annular region and the core region comprise diamond grains having a first characteristic property and a second characteristic property, respectively, that differ from one another.

By varying the properties of the annular region and the core region, materials that provide advantageous material properties may be selectively positioned within the PCD bodies. By selectively positioning materials within the PCD bodies, the local material properties of the PCD bodies may be tuned to provide enhanced resistance to wear mechanisms that are directed into local regions of the PCD bodies. For example, materials that exhibit enhanced abrasion resistance may be positioned along the perimeter surface and extending away from the working surface to improve the wear resistance of the portion of the PCD body that is brought into intimate contact with earth during a down-hole drilling operation, such that abrasion resistance of the PCD body may be increased. In other embodiments, materials may be selectively positioned within the PCD body to selectively modify PCD body properties including, for example and without limitation, the abrasion resistance, the impact resistance, the thermal stability, the stiffness, the fracture toughness, the coefficient of thermal expansion, the particle size distribution, particle size modality, particle shape, the inherent diamond grain crystal toughness, the catalyst content, the non-catalyst content, the coercivity, the sweep resistance, and combinations thereof. Through modification of these PCD body properties, improved PCD body performance may be realized.

Without being bound by theory, it is believed that through selective positioning of materials within the PCD bodies, the PCD of the core region may provide a stress state that allows for good attachment between the core region and the annular region of PCD that exhibit dissimilar characteristic properties. The configuration of the core region and the annular region of the PCD body presented herein provides resilient coupling between the annular region to the core region. Further, the configuration of the core region and the annular region of the PCD body presented herein may improve manufacturability of PCD bodies that include regions having differing characteristic properties. PCD bodies, compacts, compacts, and drill bits comprising the same are described in greater detail below.

It is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the end user. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, "about 40" means in the range of 36-44.

As used herein, the term "non-catalytic material" refers to an additive that is introduced to the polycrystalline diamond body, and that is not catalytic with carbon in forming diamond and inter-diamond grain bonds. Non-catalytic materials do not include hard-phase materials that may be introduced to the polycrystalline diamond body from the support substrate or reaction products that are formed in the polycrystalline diamond body during the HPHT processes.

Polycrystalline diamond compacts (or "PCD compacts", as used hereafter) may represent a volume of crystalline diamond grains with embedded foreign material filling the inter-granular spaces. In one example, a PCD compact includes a plurality of crystalline diamond grains that are bound to each other by strong inter-diamond bonds and forming a rigid polycrystalline diamond body, and the inter-granular regions, disposed between the bound grains and filled with a non-diamond material (e.g., a catalytic material such as cobalt or its alloys), which was used to promote diamond bonding during fabrication of the PCD compact. Suitable metal solvent catalysts may include the metal in Group VIII of the Periodic table. PCD cutting elements (or "PCD compact", as is used hereafter) include the above mentioned polycrystalline diamond body attached to a suitable support substrate (for example, cemented tungsten carbide-cobalt (WC—Co)). The attachment between the polycrystalline diamond body and the substrate may be made by virtue of the presence of a catalyst, for example cobalt metal. In another embodiment, the polycrystalline diamond body may be attached to the support substrate by brazing. In another embodiment, a PCD compact includes a plurality of crystalline diamond grains that are strongly bound to each other by a hard amorphous carbon material, for example a-C or t-C carbon. In another embodiment, a PCD compact includes a plurality of crystalline diamond grains, which are not bound to each other, but instead are bound together by foreign bonding materials such as borides, nitrides, or carbides, for example, SiC.

As discussed above, conventional PCD compacts and compacts are used in a variety of industries and applications in material removal operations. PCD compacts and compacts are typically used in non-ferrous metal removal operations and in downhole drilling operations in the petroleum industry. Conventional PCD compacts and compacts exhibit high toughness, strength, and abrasion resistance because of the inter-granular inter-diamond bonding of the diamond grains that make up the polycrystalline diamond bodies of the PCD compacts. The inter-diamond bonding of the diamond grains of the polycrystalline diamond body in a sintering reaction are promoted during an HPHT process by a catalytic material. However, at elevated temperature, the catalytic material and its byproducts that remain present in the polycrystalline diamond body after the HPHT process may promote back-conversion of diamond to non-diamond carbon forms and may induce stress into the diamond lattice due to the mismatch in the coefficient of thermal expansion of the materials.

It is conventionally known to select diamond grains that are introduced to the HPHT process, and have certain properties. For example, it is conventionally known that decreasing the particle size of the diamond grains increases the abrasion resistance and decreases the toughness of the resulting PCD compact. Conversely, it is conventionally known that increasing the particle size of the diamond grains increases the toughness and decreases the abrasion resistance of the resulting PCD compact.

Experimental results have demonstrated that diamond grains that include a multimodal particle size distribution (for example, a bimodal particle size distribution) typically results in a PCD compact that exhibits increased abrasion resistance and fracture toughness as compared to a PCD compact made from diamond grains having a monomodal particle size distribution. Without being bound by theory, it is believed that a multimodal particle size distribution of diamond grains exhibit enhanced diamond-to-diamond bonding as compared to a monomodal particle size distribution of diamond grains. This enhanced diamond-to-diamond bonding may be attributed to increased packing density of the multimodal particle size distribution diamond grains as compared to the monomodal particle size distribution diamond grains. The enhanced diamond-to-diamond bonding may be also be attributed to less diamond crystal fracturing during the HPHT process. The enhanced diamond-to-diamond bonding may further be attributed to comparatively less movement of the multimodal particle size distribution diamond grains as compared to the monomodal particle size distribution diamond grains in the HPHT process after application of pressure but before sintering of the diamond grains has completed.

Figure 2:
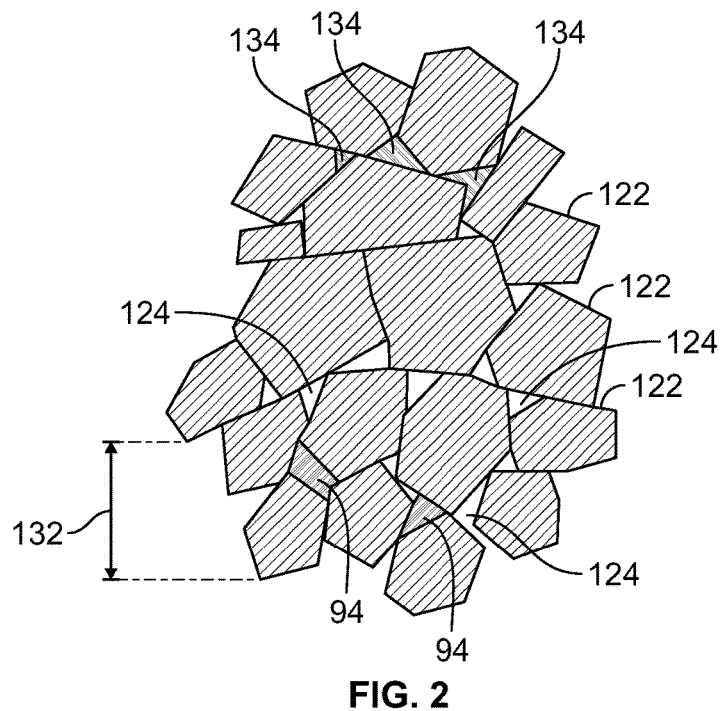
FIG. 2 is a detailed schematic side cross-sectional view of the PCD compact of FIG. 1 shown at location A.
Figure 3:
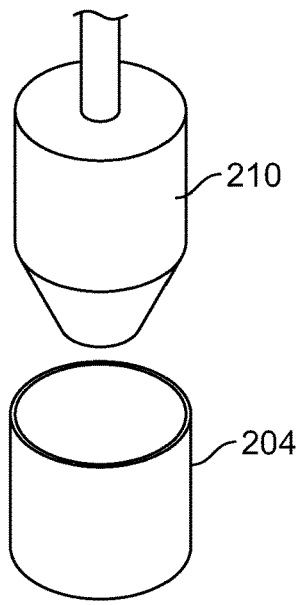
FIG. 3 is a schematic side perspective view depicting a manufacturing process of a PCD body according to one or more embodiments shown or described herein.
Figure 4:
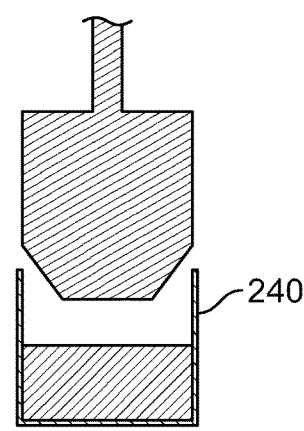
FIG. 4 is a side cross-sectional view depicting a manufacturing process of a PCD body according to one or more embodiments shown or described herein.
Figure 5:
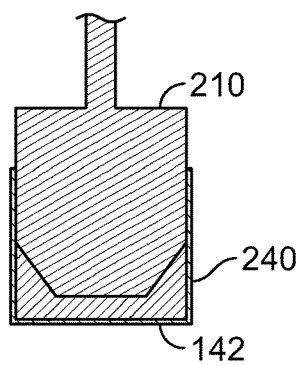
FIG. 5 is a side cross-sectional view depicting a manufacturing process of a PCD body according to one or more embodiments shown or described herein.
Figure 6:
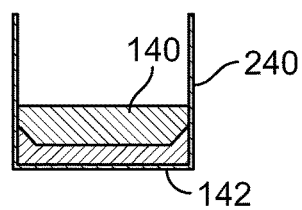
FIG. 6 is a side cross-sectional view depicting a manufacturing process of a PCD body according to one or more embodiments shown or described herein.

Referring now to FIGS. 1 and 2, the PCD compact 100 includes a support substrate 110 and a polycrystalline diamond (PCD) body 120 that is attached to the support substrate 110. The PCD body 120 includes a plurality of diamond grains 122 that are bonded to one another, including being bonded to one another through inter-diamond bonding. The bonded diamond grains 122 form a diamond lattice that extends along the PCD body 120. The diamond body 120 also includes a plurality of interstitial regions 124 between the diamond grains. The interstitial regions 124 represent a space between the diamond grains. The PCD compact 100 includes a working surface 130, a perimeter surface 132 that circumscribes the working surface 130, an interface surface 138 positioned distally from the working surface 130, and a centerline axis 134 that is concentric with the perimeter surface 132 and, as depicted, extends perpendicularly to the working surface 130. The PCD compact 100 may also include a chamfer 136 between the perimeter surface 132 and the working surface 130. The exterior surfaces of the PCD compact 100 may be cylindrically symmetric about the centerline axis 134. In the depicted embodiment, the PCD compact 100 has a generally cylindrical shape, however, other shapes of the PCD compact, including having hemispherical, domed, or oblong shapes, are envisioned without departing from the scope of the disclosure.

Referring to FIG. 1, the PCD body 120 includes a core region 140 and an annular region 142. The core region 140 and the annular region 142 are separated by an intersection surface 144. The diamond grains in the core region 140 may be in direct contact with the diamond grains of the annular region 142 and free of a non-diamond material interface, such that the intersection surface 144 represents the location of intersection of the core region 140 and the annular region 142. In one embodiment, the core region 140 and the annular region 142 may be directly connected to one another without additional material therebetween. In other embodiments, the core region 140 and the annular region 142 may be separated by an additional material. The annular region 142 decreases in thickness from the perimeter surface 132 towards the centerline axis 134, as evaluated from the working surface 130. The thickness of the annular region 142, therefore, is tapered inward from the perimeter surface 132 of the PCD body 120. In the depicted embodiment, the annular region 142 terminates at a position along the working surface 130 that is spaced apart from the centerline axis 134. In other embodiments (see FIG. 12), the annular region 142 may maintain a non-zero thickness across the working surface 130 of the PCD body 120. In the depicted embodiment, the intersection surface 144 between the annular region 142 and the core region 140 may include a generally frustoconical portion. In another embodiment, the intersection surface 144 between the annular region 142 and the core region 140 may include a concave truncated conical portion. In another embodiment, the intersection surface 144 between the annular region 142 and the core region 140 may include a convex truncated conical portion.

In certain embodiments, the intersection surface 144 between the annular region 142 and the core region 140 may be generally symmetric about the centerline axis 134. In such embodiments, the annular region 142 may have a generally uniform cross-section evaluated around the circumference of the PCD body 120. In other embodiments, the intersection surface 144 between the annular region 142 and the core region 140 may be non-symmetric about the centerline axis 134, such that the annular region 142 does not have a generally uniform cross-section when evaluated around the circumference of the PCD body 120. In one embodiment, the core region 140 may have a "lobed" pattern in which a plurality of protrusions extend outward from the core region 140 into the annular region 142. In certain embodiments, the lobed pattern of the core region 140 may have a regularly repeating pattern that is symmetric about the centerline axis 144.

The intersection surface 144 between the core region 140 and the annular region 142 may be formed at an angle relative to the centerline axis 134 that is between about 2 and about 85 degrees, for example being at an angle that is between about 10 and 60 degrees, for example, being at an angle that is between about 10 and 45 degrees, for example, being at an angle that is between about 10 and 25 degrees. The intersection surface 144 may be at an angle relative to the centerline axis 134 that replicates the angle of wear scar generation during the end user's application, such that the wear scar generated during the end user's application primarily abrades diamond from the annular region 142. In some embodiments, the angle of the intersection surface 144 relative to the centerline axis 134 may affect the impact resistance of the PCD compact 100. In one embodiment, an earth-boring tool may include a plurality of mounting surfaces within a bit body, where each of the mounting surfaces is positioned and oriented to present the PCD compact 100 for earth removal in a down-hole drilling application. The intersection surface 144 may be at an angle relative to the centerline axis 134 that is within about 5 degrees of a back-rake angle of an earth-boring tool in which the PCD compact 100 is installed.

The core region 140 may include diamond grains having a first characteristic property and the annular region 142 may include diamond grains having a second characteristic property that differs from the first characteristic property. Examples of such characteristic properties include, for example and without limitation, the abrasion resistance, the impact resistance, the thermal stability, the stiffness, the fracture toughness, the coefficient of thermal expansion, the particle size distribution, particle size modality, particle shape, the inherent diamond grain crystal toughness, the catalyst content, the non-catalyst content, the coercivity, the sweep resistance, and combinations thereof.

In some embodiments, the core region 140 and the annular region 142 may be made from starting materials that differ from one another. For example, the core region 140 may be made from starting diamond particles having a first particle size distribution. The annular region 142 may be made from starting diamond particles having a second particle size distribution.

In one exemplary embodiment, the core region 140 includes a first concentration of non-catalyst material, while the annular region 142 includes a second concentration of non-catalyst material. In some embodiments, the core region 140 may include a non-zero concentration of non-catalyst material while the annular region 142 is free of non-catalyst material. Further, the core region 140 may include a first particle size distribution, while the annular region 142 may include a second particle size distribution of diameter. In another exemplary embodiment, the annular region 142 may be substantially free of a catalyst material while the core region 140 may include a non-zero concentration of catalyst material. In yet another embodiment, the core region 140 may include a concentration of a first catalyst material and the annular region 142 may include a concentration of a second catalyst material.

During the HPHT process, the unbonded diamond grains in the core region 140 and in the annular region 142 may be compressed, such that relative movement of diamond grains is limited. However, because of the temperatures and pressures of the HPHT process, non-diamond materials may be swept along the diamond body, such that the first constituent material from the core region 140 may be introduced to the annular region 142. In such embodiments, the relatively homogeneous constituency of the core region 140 and the annular region 142 present before the HPHT process will be broken.

The HPHT process introduces a catalyst material to the unbonded diamond grains, thereby encouraging formation of diamond-to-diamond bonds between the diamond grains, and forming a monolithic polycrystalline diamond body 120. The polycrystalline diamond body 120 includes diamond grains bonded to one another through diamond-to-diamond bonds and interstitial regions 124 positioned between diamond grains. The polycrystalline diamond body 120 may continue to exhibit the core region 140 and the annular region 142 described hereinabove, although with a modified shape from the core region 140 and the annular region 140 as evaluated prior to the HPHT process.

In at least some of the interstitial regions 124, a non-carbon material is present. In some of the interstitial regions 124, a non-catalytic material is present. In other interstitial regions 124, catalytic material is present. In yet other interstitial regions 124, both non-catalytic material and catalytic material is present. In yet other interstitial regions 124, at least one of catalytic material, non-catalytic material, swept material of the support substrate 110, for example, cemented tungsten carbide, and reaction by-products of the HPHT process are present. Non-carbon, non-catalytic or catalytic materials may be bonded to diamond grains. Alternatively, non-carbon, non-catalytic or catalytic materials may be not bonded to diamond grains.

The catalytic material may be a metallic catalyst, including metallic catalysts selected from Group VIII of the periodic table, for example, cobalt, nickel, iron, or alloys thereof. The catalytic material may be present in a greater concentration in the support substrate 110 than in the polycrystalline diamond body 120, and may promote attachment of the support substrate 110 to the polycrystalline diamond body 120 in the HPHT process, as will be discussed below. The polycrystalline diamond body 120 may include an attachment region 128 that is rich in catalyst material promotes bonding between the polycrystalline diamond body 120 and the support substrate 110. In other embodiments, the concentration of the catalytic material may be greater in the polycrystalline diamond body 120 than in the support substrate 110. In yet other embodiments, the catalytic material may differ from the catalyst of the support substrate 110. The catalytic material may be a metallic catalyst reaction-by-product, for example catalyst-carbon, catalyst-tungsten, catalyst-chromium, or other catalyst compounds, which also may have lower catalytic activity towards diamond than a metallic catalyst.

The non-catalytic material may be selected from a variety of materials that are non-catalytic with the carbon-diamond conversion and include, for example, metals, metal alloys, metalloids, semiconductors, and combinations thereof. The non-catalytic material may be selected from one of copper, silver, gold, aluminum, silicon, gallium, lead, tin, bismuth, indium, thallium, tellurium, antimony, polonium, and alloys thereof.

Both non-catalytic material and catalytic material may be present in a detectable amount in the polycrystalline diamond body of the PCD compact. Presence of such materials may be identified by X-ray fluorescence, for example using a XRF analyzer available from Bruker AXS, Inc. of Madison, Wis., USA. Presence of such material may also be identified using X-ray diffraction, energy dispersive spectroscopy, or other suitable techniques.

The non-catalytic material may be introduced to the unbonded diamond particles prior to the first HPHT process in an amount that is in a range from about 0.1 wt. % to about 5 wt. % of the diamond body 120, for example an amount that is in a range from about 0.2 wt. % to about 2 wt. % of the diamond body 120. In an exemplary embodiment, non-catalytic material may be introduced to the unbonded diamond in an amount from about 0.33 to about 1 wt. %. Following the HPHT process and leaching, the non-catalytic material content is reduced by at least about 50%, including being reduced in a range from about 50% to about 80%.

In the HPHT process, catalytic material may be introduced to the diamond powders. The catalytic material may be present in an amount that is in a range from about 0.1 wt. % to about 30 wt. % of the diamond body 120, for example an amount that is in a range from about 0.3 wt. % to about 10 wt. % of the diamond body 120, including being an amount of about 5 wt. % of the diamond body 120. In an exemplary embodiment, catalytic material may be introduced to the unbonded diamond is an amount from about 4.5 wt. % to about 6 wt. %. Following the first HPHT process and leaching, the catalytic material is reduced by at least about 50%, including being reduced in a range from about 50% to about 90%.

The non-catalytic material and the catalytic material may be non-uniformly distributed in the bulk of the polycrystalline diamond compact 100 such that the respective concentrations of non-catalytic material and catalytic material vary at different positions within the polycrystalline diamond body 120. In one embodiment the non-catalytic material may be arranged to have a concentration gradient that is evaluated along the centerline axis 134 of the polycrystalline diamond compact 100. The concentration of the non-catalytic material may be higher at positions evaluated distally from the substrate 110 than at positions evaluated proximally to the substrate 110. In opposite, the concentration of the catalytic material may be greater at positions evaluated proximally to the substrate 110 than at positions evaluated distally from the substrate 110. In yet another embodiment, the concentrations of the non-catalytic material and the catalytic material may undergo an interrupted or a continuous change when evaluated along the centerline axis 134 of the polycrystalline diamond compact 100. In some embodiments, the concentration of non-catalytic material may experience a step change, where the step change in concentration reflects the location of the intersection between the core region 140 and the annular region 142. In another embodiment, the concentration of non-catalytic material may exhibit a continuous change that exhibits an inflection point in the concentration, where the inflection point in concentration reflects the location of the intersection between the core region 140 and the annular region 142. In yet another embodiment, the concentrations of the non-catalytic material and the catalytic material may exhibit a variety of patterns or configurations. Independent of the concentration of the non-catalytic material and the catalytic material in the polycrystalline diamond body 120, however, both non-catalytic material and catalytic material may be detectible along surfaces proximately and distally located relative to the substrate 110.

In another embodiment, the polycrystalline diamond body 120 may exhibit relatively high amounts of the catalytic material at positions proximate to the substrate 110 and at which the catalytic material forms a bond between the polycrystalline diamond body 120 and the substrate 110. In some embodiments, at positions outside of such an attachment zone, the non-catalytic material and the catalytic material maintain the concentration variation described above.

Embodiments according to the present disclosure may undergo a conventionally-known leaching operation in which portions of the PCD compact are subjected to a leaching agent. The leaching agent may at least partially dissolve material from interstitial regions between the bonded diamond grains while the diamond grain structure is left intact. The resulting PCD compact structure may continue to exhibit material in interstitial regions that are inaccessible to the leaching agent. Such materials may include non-diamond material, such as catalyst material or non-catalyst material.

While embodiments depicted and described herein discuss the presence of an annular regions and a core region, it should be understood that PCD compacts according to the present disclosure may include a plurality of annular regions that are positioned in a nested arrangement relative to one another, and each of the annular regions includes an intersection surface between the two adjacent annular regions or the adjacent annular region and core region.

Polycrystalline diamond bodies 120 according to the present disclosure may be fabricated according to a variety of methods. Referring now to FIGS. 3-6, one embodiment of an apparatus for filling a low-reactivity cup 204 is depicted. The apparatus includes a mandrel 210 that displaces unbonded diamond grains, thereby forming a pre-determined shape of the unbonded diamond grains. In practice, the low-reactivity cup 204 may be positioned on a static support. Unbonded diamond grains that later form the annular region 142 are positioned in the low-reactivity cup 204. The mandrel 210 is brought into contact with the unbonded diamond grains and displaces diamond grains that it comes into contact with, thereby introducing a shape into the unbonded diamond grains that are positioned in the low-reactivity cup 204. Subsequent to formation of the shape in the bonded diamond grains, additional unbonded diamond grains may be added to the low-reactivity cup 204. The composition of the subsequently added unbonded diamond grains may differ from the unbonded diamond grains that were introduced earlier to the low-reactivity cup 204.

The low-reactivity cup 204 and the diamond grains positioned therein may be positioned proximate to a catalyst material source, for example a cobalt cemented tungsten carbide substrate. The low-reactivity cup 204 and the diamond grains may be subjected to a HPHT process in which the low-reactivity cup 204 and the diamond grains are subjected to conditions of elevated pressure and temperature sufficient to cause the previously unbonded diamond grains to form diamond-to-diamond bonds between one another. Following the completion of the HPHT process, a recovered monolithic polycrystalline diamond body 120 may be recovered from the HPHT apparatus.

The different material compositions between the annular region 142 and the core region 140 may provide different properties between the annular region 142 and the core region 140. Examples of such properties include, for example and without limitation, the abrasion resistance, the impact resistance, the thermal stability, the stiffness, the fracture toughness, the coefficient of thermal expansion, the particle size distribution, particle size modality, particle shape, the inherent diamond grain crystal toughness, the catalyst content, the non-catalyst content, the coercivity, the sweep resistance, diamond contiguity, and combinations thereof. In some embodiments, materials may be introduced to the annular region 142 from the core region 140 and/or the substrate 110 during the HPHT process. In one example, a non-catalytic material, for example, copper, silver, gold, aluminum, silicon, gallium, lead, tin, bismuth, indium, thallium, tellurium, antimony, polonium, or alloys thereof, may be blended with the diamond grains of the core region 140 prior to the diamond grains being deposited in the low-reactivity cup 204. The diamond grains of the annular region 142 and the core region 140 may be free of catalyst material prior to the HPHT process. During the HPHT process, the non-catalyst material that is mixed with the diamond grains of the core region 140 may be swept into the diamond grains of the annular region 142. Further, during the HPHT process the catalyst material, which is present in the substrate 110, is swept into the diamond grains of the core region 140 and the annular region 142, thereby accelerating sintering of the diamond grains.

Additionally, and without being bound by theory, it is believed that by having diamond grains with different properties in the annular region 142 and the core region 140, the properties of the HPHT process itself can be modified. In one example, the diamond grains in the core region 140 may first be mixed with a non-diamond material, for example, a non-catalyst material such as copper, silver, gold, aluminum, silicon, gallium, lead, tin, bismuth, indium, thallium, tellurium, antimony, polonium, or alloys thereof, while the diamond grains in the annular region 142 is free of such non-diamond material prior to the HPHT process. During the HPHT process, the non-diamond material may be swept from the diamond grains in the core region 140 into the diamond grains in the annular region 142. The variation in materials between the core region 140 and the annular region 142 may allow for the non-diamond material to be introduced into the annular region 142 in a concentration that differs from the concentration in the core region 140.

Placement of the diamond grains of the annular region 142 without introduction of non-diamond material and/or catalyst material in the annular region 142 may allow for a maximum of diamond density within the annular region prior to the HPHT process. During the HPHT process, the unbonded diamond grains in the annular region 142 may be pressurized, such that a maximum packing density of the unbonded diamond grains is realized. A lack of non-diamond and/or catalyst materials in the annular region 142 may minimize spacing between unbonded diamond grains, resulting in comparatively small interstitial regions between the bonded diamond grains, and thereby allowing for the highest packing density. Additionally, during the HPHT process non-diamond material and/or catalyst material may be introduced into the unbonded diamond grains of the annular region 142. Because of the pressures and temperatures of the HPHT process, the introduction of the non-diamond material and/or catalyst material may encourage sintering of the diamond grains. Further, the increased diamond density and the reduced interstitial regions between the inter-bonded diamond grains in the annular region 142 may result in a decrease in defect centers from which defects in the polycrystalline diamond body may grow.

It is believed that by positioning the non-diamond material in the core region 140 and not in the annular region 142, the dynamics of the sweep during the HPHT process can be modified. In one example, the diamond grains in the annular region 142 may have a different resistance to sweep than the diamond grains in the core region 140. In one embodiment, the non-diamond material that is mixed with the diamond grains may be difficult to sweep during the HPHT process. By including the non-diamond material in the core region 140 and excluding the non-diamond material from the annular region 142, the non-diamond material may be swept from the core region 140 into the annular region 142. The variation in concentration of the non-diamond material prior to the HPHT process may allow for the non-diamond material to be swept from the core region 140 to the annular region 142, which may provide a more even transition from the core region 140 to the annular region 142 than had if the non-diamond material be placed in both the core region 140 and the annular region 142 prior to the HPHT process. Providing a more even transition from the core region 140 to the annular region 142 may reduce variations in the internal stress field of the monolithic polycrystalline diamond body 120, and/or may reduce the occurrence of defects that would otherwise be introduced to the polycrystalline diamond body because of a variation in a characteristic property between the diamond grains of the core region 140 and the diamond grains of the annular region 142.

In other embodiments in which sintering of the diamond grains and/or non-diamond material has proven to be difficult, incorporation of a diamond body having a core region 140 and an annular region 142 may allow for enhanced sintering of the diamond grains that are positioned in the annular region 142 as compared to a diamond body that is free of various regions. In particular, it is believed that the incorporation of the annular region 142 to a polycrystalline diamond body 120 allows for a reduced volume of difficult-to-sinter material that is sintered during the HPHT process. Because the volume of diamond grains is relatively smaller in the annular region 142, the distance through which catalyst material is swept through difficult-to-sinter material is reduced. Therefore, the incorporation of the annular region 142 may increase the likelihood of high-quality sintering of difficult-to-sinter materials and may reduce the amount of difficult-to-sinter materials while maintaining the performance attribute offered by the difficult-to-sinter material.

Additionally, when the polycrystalline diamond bodies are used in down-hole drilling bits, the diamond grains of the annular region 142 are typically subjected to more wear than the diamond grains of the core region 140. Accordingly, by positioning diamond grains with preferred mechanical properties (for example, highly abrasion resistant, highly tough, highly thermally stable) in the annular region 142, the benefits of those diamond grains can be realized by the end user without the diamond grains of the core region 140 having to share those properties. Therefore, the diamond grains of the core region 140 and the diamond grains of the annular region 142 may be selected to provide a desired combination of mechanical properties that are beneficial to the end user.

In some embodiments, the intersection surface between the core region and the annular region may have a single facet. In some embodiments, the intersection surface may be generally linear when evaluated along a centerline cross-section. In other embodiments, the intersection surface may be generally curved. In some embodiments, the intersection surface may include a plurality of faceted linear portions. In other embodiments, the intersection surface may include a plurality of smoothly-connected linear portions. In some embodiments, the intersection surface between the core region and the annular region may be normal to at least one of the working surface, the perimeter surface, or the chamfer of the PCD compact. In another embodiment, the intersection surface between the core region and the annular region may be angled at a non-normal orientation to all of the working surface, the perimeter surface, and the chamfer of the PCD compact. In another embodiment, the intersection surface between the core region and the annular region may be angled at a non-normal orientation to all of the working surface, the perimeter surface, and the chamfer of the PCD compact at locations that project normally from the respective working surface, the perimeter surface, and the chamfer. Note that some variation in shape of the intersection surface is to be expected due to the fabrication process, including due to positioning of a substrate into a low-reactivity cup and the pressures applied during an HPHT process.

In some embodiments, the intersection surface between the core region and the annular region may extend a distance evaluated along the centerline axis of the polycrystalline diamond body that is at least 25% of a thickness of the polycrystalline diamond body, as evaluated from the working surface to the interface surface, being, for example, at least 50% of the thickness of the polycrystalline diamond body, for example at least 75% of the thickness of the polycrystalline diamond body, for example, at least 85% of the thickness of the polycrystalline diamond body, up to 100% of the thickness of the polycrystalline diamond body.

Figure 7:
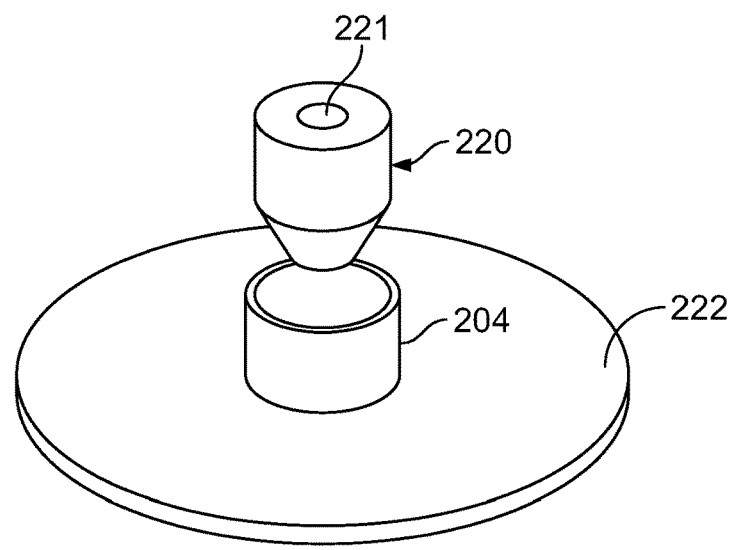
FIG. 7 is a schematic side perspective view depicting a manufacturing process of a PCD body according to one or more embodiments shown or described herein.
Figure 8:
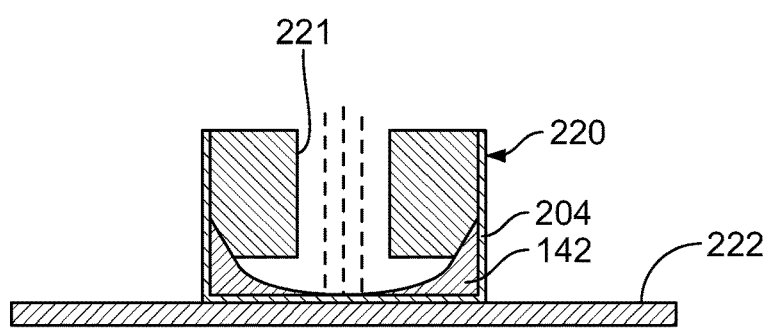
FIG. 8 is a side cross-sectional view depicting a manufacturing process of a PCD body according to one or more embodiments shown or described herein.
Figure 9:
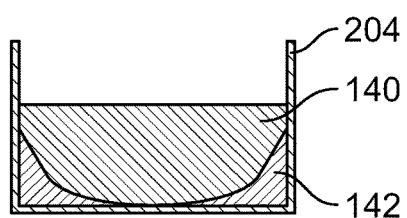
FIG. 9 is a side cross-sectional view depicting a manufacturing process of a PCD body according to one or more embodiments shown or described herein.

Referring now to FIGS. 7-9, another embodiment of an apparatus for filling a low-reactivity cup 204 is depicted. The apparatus includes a rotating table 222 onto which the low-reactivity cup 204 is positioned. A conduit 220 is positioned at least partially within the low-reactivity cup 204. The rotating table 222, the low-reactivity cup 204, and the conduit 220 simultaneous spin about an axis of rotation of the rotating table 222. Diamond grains are fed through the opening 221 of the conduit 220, fall downward due to gravity, and are subjected to centripetal acceleration that displaces the diamond grains outward due to the rotation of the low-reactivity cup 204 on the rotating table 222. Diamond grains may fill the open region between the low-reactivity cup 204 and the conduit 220, including by moving in a direction opposite gravity, such that the diamond grains extend to a position above the lowest vertical position of the conduit 220. The diamond grains that are loaded into the low-reactivity cup 204 through the conduit 220 form the annular region 142 of the finished monolithic polycrystalline diamond body 120.

Subsequent to positioning the diamond grains in low-reactivity cup 204 through the conduit 220, the conduit 220 may be removed from the low-reactivity cup 204. The low-reactivity cup 204 is subsequently filled with additional diamond grains, which form the core region 140 of the finished monolithic polycrystalline diamond body 120, that are positioned on top of the previously placed diamond grains that form the annular region 142 finished monolithic polycrystalline diamond body 120.

Similar to the previously discussed embodiment, the reactivity cup 204 and the diamond grains positioned therein may be positioned proximate to a catalyst material source, for example a cobalt cemented tungsten carbide substrate. The low-reactivity cup 204 and the diamond grains may be subjected to a HPHT process in which the low-reactivity cup 204 and the diamond grains are subjected to conditions of elevated pressure and temperature sufficient to cause the previously unbonded diamond grains to form diamond-to-diamond bonds between one another. Following the completion of the HPHT process, a recovered monolithic polycrystalline diamond body 120 may be recovered from the HPHT apparatus. The recovered polycrystalline diamond body 120 may continue to exhibit a shape consistent with the shape of the intersection between the annular region 142 and the core region 140 that was introduced to the unbonded diamond grains during loading of the low-reactivity cup 204, as discussed above.

In yet another embodiment of the fabrication process (not shown), unbonded diamond grains may be positioned in a low-reactivity cup. Subsequently, a mandrel may be positioned to enclose the low-reactivity cup, and the low reactivity cup, the mandrel, and the low reactivity cup's contents may be positioned on a rotating table and spun about an axis of rotation of the rotating table. The diamond grains may fill the open regions between the low-reactivity cup and the mandrel, including by moving in a direction opposite gravity, such that the diamond grains extend to a position above the lowest vertical position of the mandrel. The low-reactivity cup and the diamond grains may be processed according to the above-discussed fabrication embodiments to arrive at a PCD compact.

In some embodiments, vibratory energy, for example, ultrasonic vibratory energy, may be introduced to the unbonded diamond grains to encourage even distribution prior to introduction to the HPHT process. The vibratory energy may enhance distribution of the unbonded diamond grains before, during, or after loading the unbonded diamond grains into the low-reactivity cup, including, for example, simultaneous spinning and vibrating of the low-reactivity cup and the unbonded diamond grains positioned therein. In some embodiments, the unbonded diamond grains may be distributed in the low-reactivity cup using pneumatic or a hydraulic agitation. In some embodiments, the unbonded diamond grains may be positioned into the low-reactivity cup using a slurry loading technique in which diamond grains are at least partially held in suspension in a liquid vehicle.

In some embodiments, an annular region may be fabricated into an at least semi-rigid body that has sufficient strength to resist handling damage, and may be referred to as a green body. In some embodiments, the strength of the green body may be provided by a binder, for example an organic or an inorganic polymer. The green body of the annular region may be positioned within the low-reactivity cup. The low-reactivity cup may subsequently be filled with unbonded diamond grains having a different characteristic than the diamond grains of the green body, as described in the above-discussed fabrication embodiments. The low-reactivity cup and the diamond grains may be processed according to the above-discussed fabrication embodiments to arrive at a PCD compact. The binder of the green body, if any, may be removed from the diamond grains during the HPHT process or in a separate heating cycle of the diamond grains.

It should be understood that embodiments of the polycrystalline diamond bodies 120 according to the present disclosure may have a variety of shapes and configurations of the annular region 142 and the core region 140 of the polycrystalline diamond body 120. Examples of such shapes are depicted in FIGS. 10-15.

Figure 10:
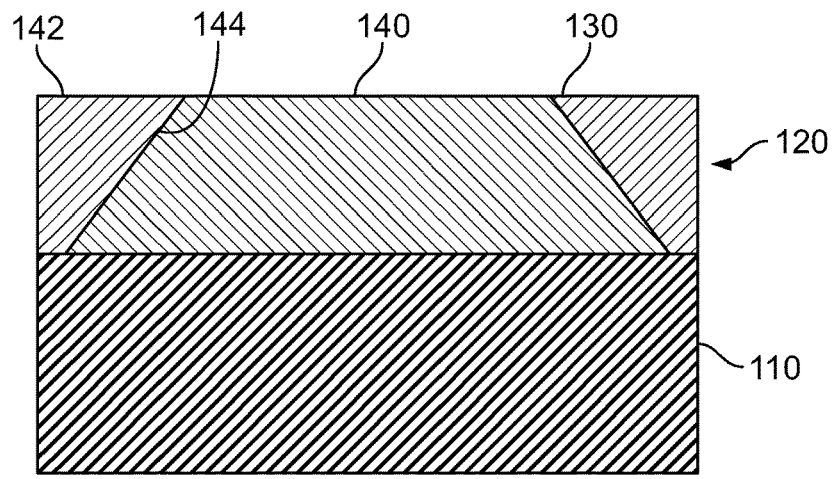
FIG. 10 is a side cross-sectional view of a supported PCD compact having a PCD body according to one or more embodiments shown or described herein.

Referring to FIG. 10, the polycrystalline diamond body 120 exhibits an intersection 144 between the core region 140 and the annular region 142, where the intersection 144 has a generally frustoconical shape. In this embodiment, the intersection 144 extends from the working surface 130 of the polycrystalline diamond body 120 to the substrate 110.

Figure 11:
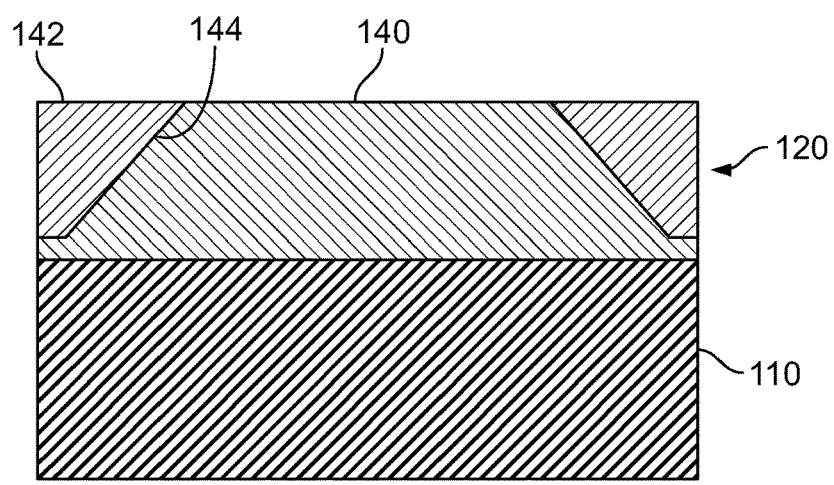
FIG. 11 is a side cross-sectional view of a supported PCD compact having a PCD body according to one or more embodiments shown or described herein.

Referring now to FIG. 11, the polycrystalline diamond body 120 exhibits an intersection 144 between the core region 140 and the annular region 142, where the intersection 144 has a generally frustoconical shape. In this embodiment, the intersection 144 extends from the working surface 130 of the polycrystalline diamond body 120 and is terminated at a longitudinal position short of the substrate 110.

Figure 12:
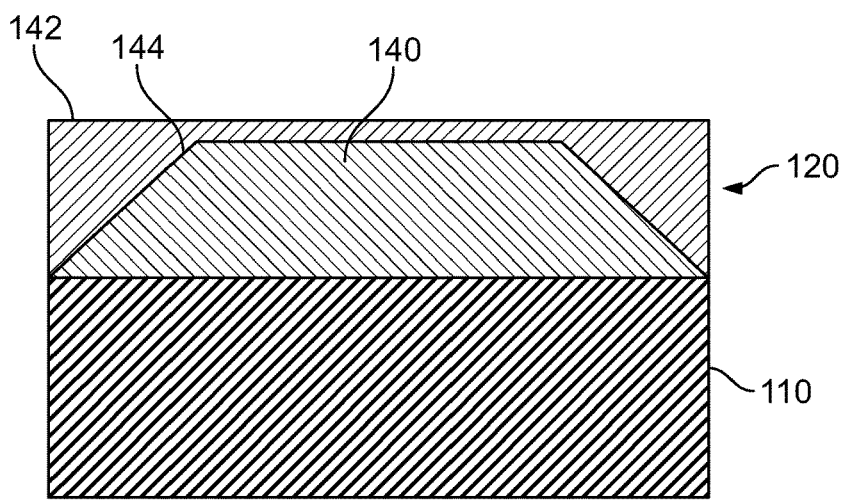
FIG. 12 is a side cross-sectional view of a supported PCD compact having a PCD body according to one or more embodiments shown or described herein.

Referring now to FIG. 12, the polycrystalline diamond body 120 exhibits an intersection 144 between the core region 140 and the annular region 142, where the intersection 144 has a generally frustoconical shape. In this embodiment, the intersection 144 extends at a distance away from the working surface of the polycrystalline diamond body 120 and terminates at the substrate 110. The intersection 144 between the core region 140 and the annular region 142 is spaced apart from the working surface 130 at radial positions inside of the frustoconical portion of the intersection 144.

Figure 13:
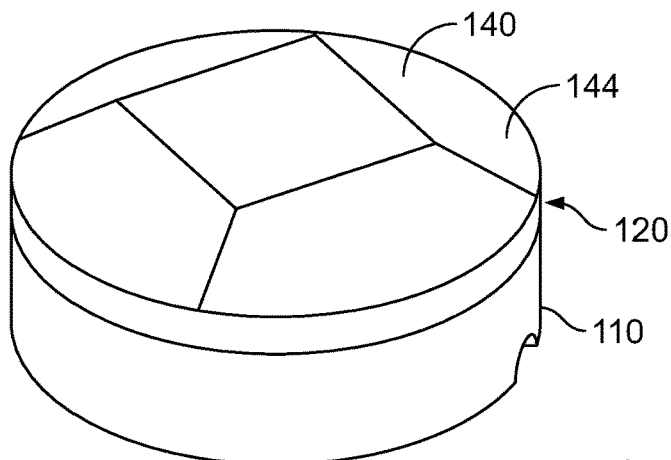
FIG. 13 is a side perspective view of a supported PCD compact having a PCD body according to one or more embodiments shown or described herein.

Referring now to FIG. 13, a polycrystalline diamond body 120 is depicted with a portion of the polycrystalline diamond body removed for illustrative clarity. The polycrystalline diamond body 120 exhibits an intersection 144 between the core region 140 and the annular region (not shown), where the intersection 144 has a shape corresponding to a truncated pyramid. While the embodiment depicted in FIG. 13 exhibits a truncated square pyramid, it should be understood that other pyramidal frustums are contemplated, including truncated triangular pyramids and truncated pentagonal pyramids.

Figure 14:
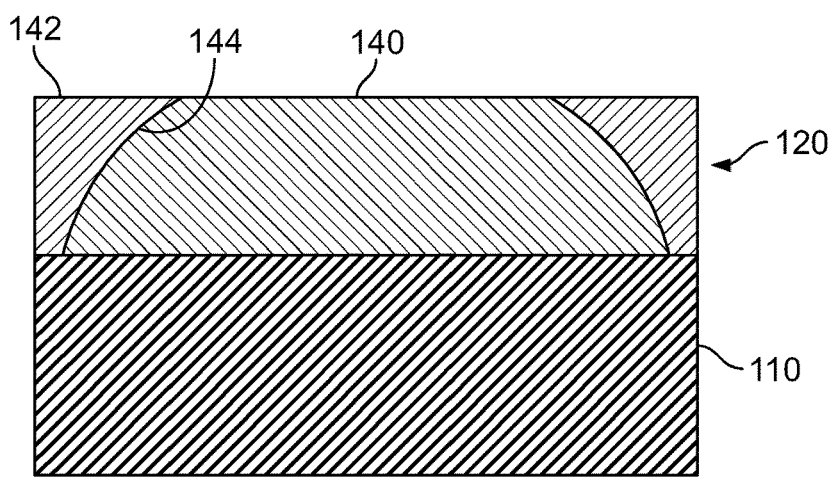
FIG. 14 is a side cross-sectional view of a supported PCD compact having a PCD body according to one or more embodiments shown or described herein.

Referring now to FIG. 14, the polycrystalline diamond body 120 exhibits an intersection 144 between the core region 140 and the annular region 142, where the intersection 144 has a shape corresponding to a truncated paraboloid.

Figure 15:
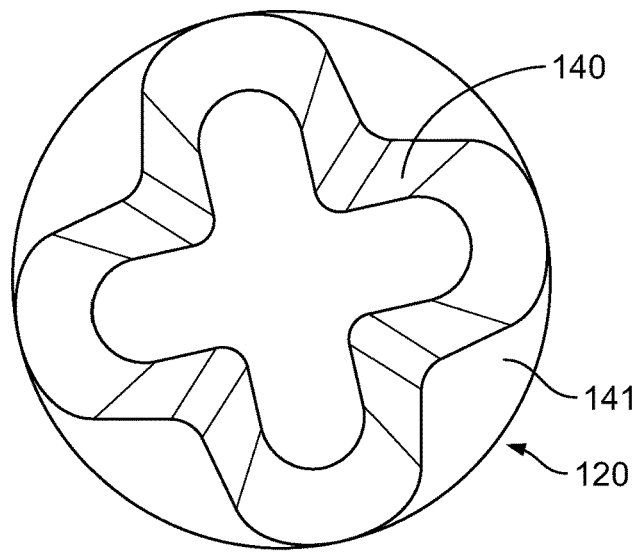
FIG. 15 is a side perspective view of a supported PCD compact having a PCD body according to one or more embodiments shown or described herein.

Referring now to FIG. 15, a polycrystalline diamond body 120 is depicted with a portion of the polycrystalline diamond body removed for illustrative clarity. The polycrystalline diamond body 120 exhibits an intersection 144 between the core region 140 and the annular region 142, where the intersection 144 has a shape corresponding to a lobed truncated conical surface. In the embodiment depicted in FIG. 15, the intersection shape 144 exhibits a 4-lobed truncated conical surface. However, it should be understood that other lobed truncated conical surfaces are contemplated including 2-lobed truncated conical surfaces, 3-lobed truncated conical surfaces, and 5-lobed truncated conical surfaces.

Figure 16:
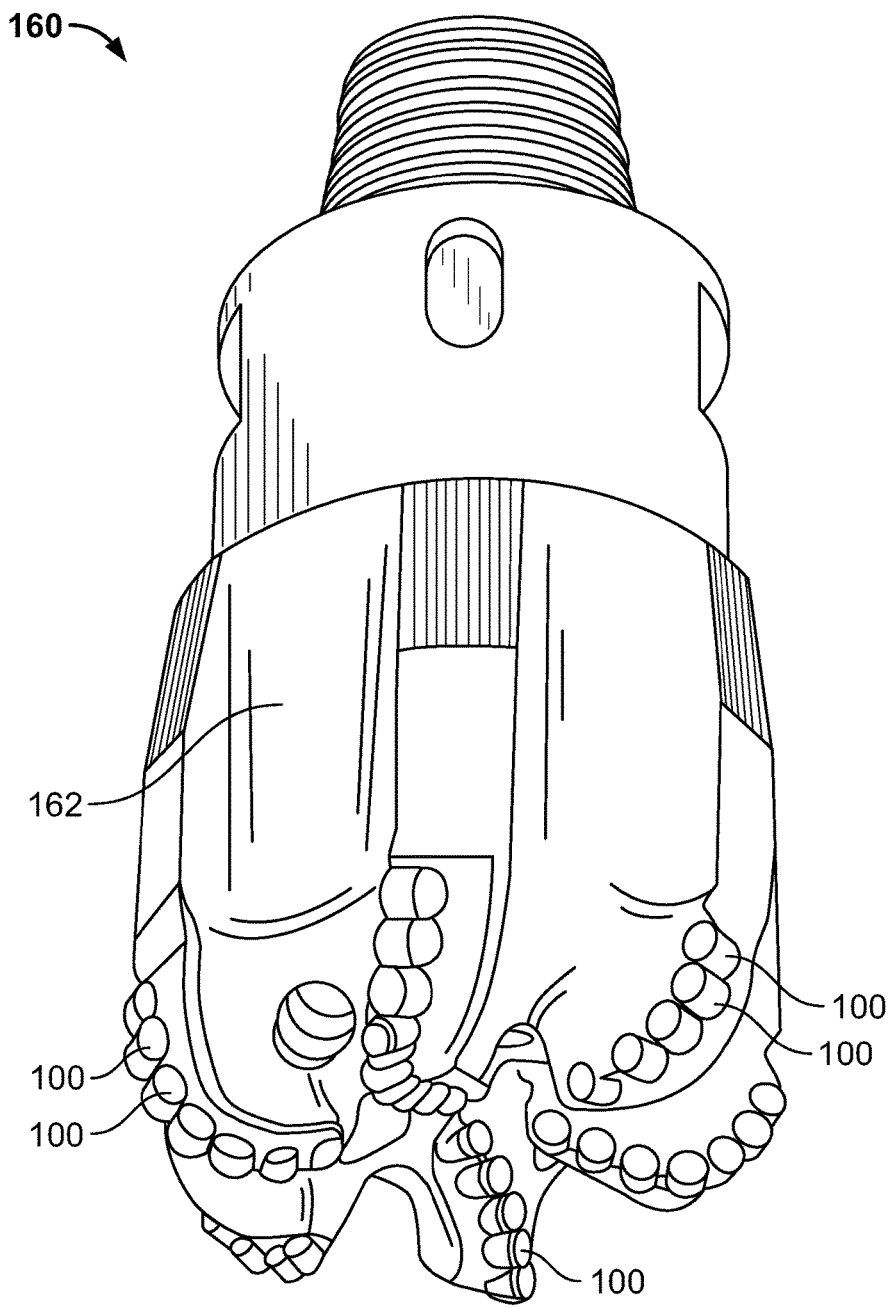
FIG. 16 is a side perspective view of a earth-boring tool having PCD compacts attached thereto according to one or more embodiments shown or described herein.

Referring now to FIG. 16, an earth-boring tool 160 having at least one PCD compact 100 according to the present disclosure is depicted. The earth-boring tool 160 includes a bit body 162 having a plurality of mounting surfaces. Each of the mounting surfaces is positioned and oriented to present the PCD compact 100 for earth removal in a downhole drilling application.

EXAMPLES

Example A (Comparative Example)

Conventional polycrystalline diamond compacts having a monolithic polycrystalline diamond body and a cobalt cemented tungsten carbide substrate was produced in an HPHT process. The PCD compacts were made from feed diamond grains having a uniform, bimodal feed of about 93 vol. % diamond having a D50 of about 16 µm and about 7 vol. % diamond having a D50 of about 1 µm. A cobalt cemented-tungsten carbide substrate was positioned to close the low-reactivity cup. The cup was introduced to a belt-type HPHT apparatus. The low-reactivity cup and its contents were subjected to a maximum pressure of about 8 GPa and to a temperature above the melting point of cobalt for about 6 minutes. Supported PCD compacts were recovered from the HPHT apparatus and processed according to conventional finishing operations to arrive at a cylindrical PCD compact having a diameter of about 16 mm and a diamond table height of about 2.1 mm.

The PCD compacts were subjected to a test that replicates forces experienced by the polycrystalline diamond body in a downhole drilling application. The PCD compacts were installed in a vertical turret lathe ("VTL") and used to machine granite. Parameters of the VTL test may be varied to replicate desired test conditions. In one example, the PCD compacts were configured to remove material from a Barre white granite workpiece. The PCD compacts were positioned with a 15° back-rake angle relative to the workpiece surface. The PCD compacts were positioned at a nominal depth of cut of 0.25 mm. The infeed of the PCD compacts was set to a constant rate of 7.6 mm/revolution with the workpiece rotating at 60 RPM. The PCD compacts were water cooled.

The VTL test introduces a wear scar into the PCD compacts along the position of contact between the PCD compacts and the granite. The size of the wear scar is compared to the material removed from the granite workpiece to evaluate the abrasion resistance of the PCD compacts. The respective performance of multiple polycrystalline diamond bodies may be evaluated by comparing the rate of wear scar growth and the material removal from the granite workpiece. Abrasion resistance performance captured by comparing the wear scar size to the volume of granite machined by the PCD compacts of this and other examples is reproduced in Table 1 below.

PCD compacts made according to the present example were also subjected to a frontal impact test. PCD compacts were prepared with a chamfer between the working surface and the perimeter surface. The PCD compacts were rigidly held in a clamping fixture by gripping on the outer diameter of the substrate, leaving a section of the polycrystalline diamond body exposed. Using an Instron Model instrument, the clamping fixture and the PCD compact were raised to a designated height above an impact bar. The impact bar was rectangular in shape with a square cross section, and made of steel that was through-hardened to a hardness of 60 on the Rockwell C scale. The height and mass of the clamping fixture and the PCD compact determine the kinetic energy of an impact between the PCD compact and the impact bar.

The PCD compact was positioned within the clamping fixture so that when dropped onto the impact bar, the PCD compact impacts at an angle of 15 degrees relative to the working surface of the PCD compact. Restate, the axis of symmetry of the PCD compact is aligned 15 degrees from normal with the contact surface of the impact bar.

Figure 17:
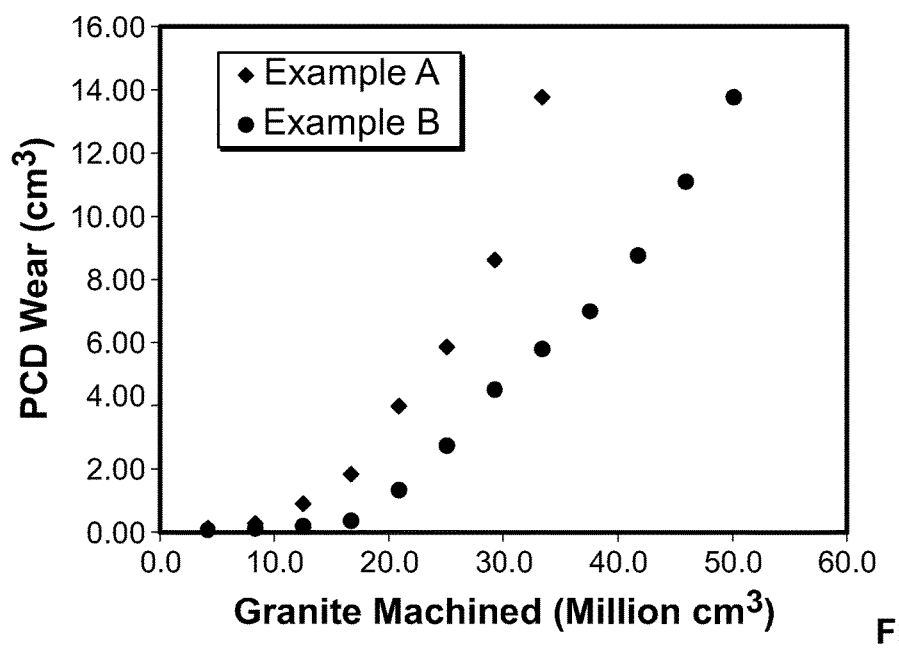
FIG. 17 is a plot of abrasive wear data for conventional and disclosed PCD compacts according to one or more embodiments shown or described herein.

The test method evaluates the maximum kinetic energy absorbed by the PCD compact before cracks are induced. A first estimate of the maximum kinetic energy is set in a first impact. In subsequent drops, the maximum kinetic energy is increased and/or decreased and the PCD compact is rotated to determine the maximum kinetic energy absorbed by the PCD compact before cracks are induced. Multiple drops were completed at different clocking locations of the PCD compacts to arrive at an average value of energy absorbed. Frontal impact performance of the PCD compacts of this and other examples is reproduced in Table 2 below and in FIG. 17.

Example B

PCD compacts according to the present disclosure were fabricated having a core region of polycrystalline diamond and an annular region of polycrystalline diamond. The PCD compacts were made with a first population of diamond grains (that form an annular region) having a bimodal feed of about 93 vol. % diamond having a D50 of about 16 µm and about 7 vol. % diamond having a D50 of about 1 µm. The PCD compacts had a second population of diamond grains (that formed the core region) having a monomodal feed of diamond having a D50 of about 20 µm. The core region was supplemented with about 1.3 wt. % bismuth powder, as evaluated prior to the HPHT process. The diamond grains were introduced to the low-reactivity cup was completed using a filling apparatus having a rotating table, as depicted in FIGS. 7-9. These diamond grains were fed into the low-reactivity cup and the diamond grains exhibited a frustoconical shape that was complementary to the shape of the conduit, and had a shape that corresponded to the embodiment depicted in FIG. 11.

A cobalt cemented-tungsten carbide substrate was positioned in the low-reactivity cup and against the diamond grains. A cell assembly was built around the low-reactivity cup and substrate. The cell assembly was inserted into a belt-type pressure apparatus where the cell assembly and its contents were exposed to a HPHT process. The cell assembly was subjected to a maximum pressure of about 8 GPa and held above the melting temperature of cobalt for about 6 minutes. The HPHT process produced a polycrystalline diamond body that was integrally sintered to the substrate. Supported PCD compacts were recovered from the HPHT apparatus and processed according to conventional finishing operations to arrive at a cylindrical PCD compact having a diameter of about 16 mm and a diamond table height of about 2.1 mm.

A polycrystalline diamond body was destructively inspected to evaluate the quality of the sinter reaction. In the polycrystalline diamond body made according to Example B, body exhibited complete sinter throughout the body. XRF analysis of the polycrystalline diamond body indicated that bismuth was present in all areas of the polycrystalline diamond body, including in regions of the polycrystalline diamond corresponding to where no bismuth was present prior to the HPHT process. As such, the XRF analysis demonstrated that bismuth was swept into the first population of diamond grains from the second population of diamond grains during the HPHT process.

The PCD compacts according to this example were tested in accordance with the above-referenced VLT test parameters. Abrasion resistance performance captured by comparing the wear scar size to the volume of granite machined by the PCD compacts of this example is reproduced in Table 1 below. Cutters were impacted tested as outlined in the previous example and the results are tabulated in Table 2.

TABLE 1

Abrasion Resistance Test Results

| Granite Machined (million mm³) | Example A | Example B |
| --- | --- | --- |
| | PCD Wear (mm³) | |
| 4.2 | 0.13 | 0.08 |
| 8.4 | 0.28 | 0.13 |
| 12.5 | 0.90 | 0.20 |
| 16.7 | 1.84 | 0.37 |
| 20.9 | 3.99 | 1.34 |
| 25.1 | 5.86 | 2.74 |
| 29.2 | 8.63 | 4.52 |
| 33.4 | 13.77 | 5.80 |
| 37.6 | | 7.00 |
| 41.8 | | 8.77 |
| 45.9 | | 11.10 |
| 50.1 | | 13.77 |

TABLE 2

Impact Resistance Test Results

| Example A | Example B |
| --- | --- |
| Average Maximum Energy Absorbed (J) | |
| 9.7 | 15.7 |

Example C

PCD compacts according to Example B were produced and subsequently subjected to a leaching operation in which portions of the polycrystalline diamond body were brought into intimate contact with a leaching agent. The leaching agent successfully removed substantially all of the cobalt (catalyst material) and bismuth from the interstitial regions between bonded diamond grains that were positioned proximate to the working surface of the PCD compacts.

Figure 18:
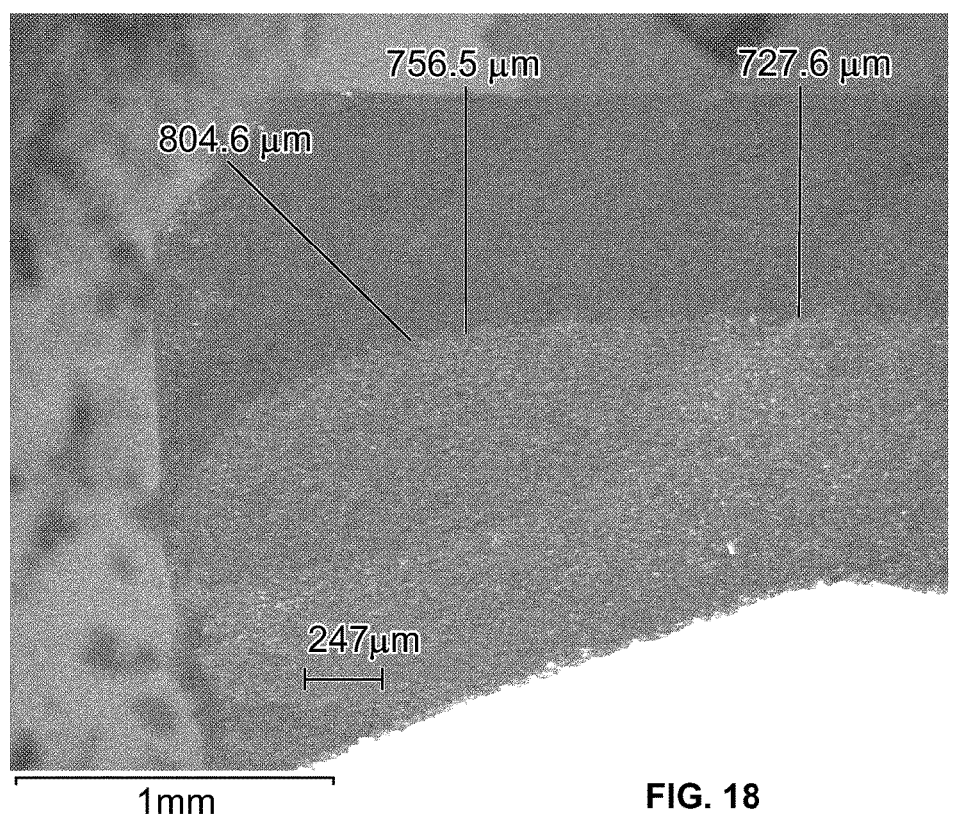
FIG. 18 is a micrograph of a leached PCD compact according to one or more embodiments shown or described herein.

A PCD compact was sectioned and examined in a scanning electron microscope. A micrograph taken from the SEM is reproduced as FIG. 18. As depicted, the micrograph illustrates the leached region in the darkest grey, the unleached annular region in the intermediate grey, and the unleached core region in lightest grey.

It should now be understood that polycrystalline diamond bodies may include an annular region of inter-bonded diamond grains that extends away from at least a portion of the working surface and the perimeter surface of the polycrystalline diamond body and a core region of inter-bonded diamond grains that are bonded to the annular region. The diamond grains of the annular region may have a first characteristic property, while the diamond grains of the core region may have a second characteristic property that differs from the first characteristic property. The variation between the diamond grains of the annular region and the diamond grains of the core region may allow for enhanced sweep of non-diamond materials through the diamond grains during the HPHT process. The variation between the diamond grains of the annular region and the diamond grains of the core region may also allow for diamond grains to be preferentially placed in the polycrystalline diamond body that provides desirable mechanical properties for a chosen end user application.

While reference has been made to specific embodiments, it is apparent that other embodiments and variations can be devised by others skilled in the art without departing from their spirit and scope of this disclosure. The appended claims are intended to be construed to include all such embodiments and equivalent variations.

The invention claimed is:

1. A method of making a polycrystalline diamond body, comprising:
   positioning a first quantity of diamond grains having a first characteristic property in a low-reactivity cup having a perimeter wall;
   distributing the first quantity of diamond grains into an at least partially annular configuration in which the annular region decreases in thickness from the perimeter wall towards a centerline axis of the low-reactivity cup, wherein wherein the first quantity of diamond grains is distributed into the low-reactivity cup by displacing the unbonded diamond grains with a mandrel;
   positioning a second quantity of diamond grains having a second characteristic property that differs from the first characteristic property in the low-reactivity cup, the second quantity of diamond grains be positioned to at least partially contact the perimeter wall of the low-reactivity cup and to at least partially contact the first quantity of diamond grains; and
   subjecting the low-reactivity cup, the first quantity of diamond grains, and the second quantity of diamond grains to a HPHT process in which adjacent diamond grains are sintered to one another and form diamond-to-diamond bonds.

2. The method of claim 1, further comprising, during the HPHT process, melting and directing a catalyst material through the first quantity of diamond grains and the second quantity of diamond grains, thereby encouraging diamond-to-diamond bonding of adjacent diamond grains.

3. The method of claim 1, further comprising positioning a substrate material proximate to the second quantity of diamond grains to enclose the low-reactivity cup.

4. The method of claim 3, wherein the substrate material comprises hard metal carbides.

5. The method of claim 4, wherein the substrate material further comprises a catalyst material.

6. The method of claim 1, further comprising mixing catalyst material into the second quantity of diamond grains.

7. The method of claim 1, further comprising mixing non-catalyst material into the second quantity of diamond grains.

8. The method of claim 7, further comprising, during the HPHT process, melting the noncatalyst material and directing the non-catalyst material from the second quantity of diamond grains into the first quantity of diamond grains.

9. The method of claim 1, wherein the second quantity of diamond grains is in direct contact with the first quantity of diamond grains.

10. The method of claim 2, wherein the catalyst material comprises a metal from Group VIII in the periodic table.

11. The method of claim 1, wherein the mandrel is rotated relative to the low-reactivity cup.

12. The method of claim 1, wherein the mandrel is traversed into the low-reactivity cup.

13. A method of making a polycrystalline diamond body, comprising:
    positioning a first quantity of diamond grains having a first characteristic property in a low-reactivity cup having a perimeter wall;
    distributing the first quantity of diamond grains into an at least partially annular configuration in which the annular region decreases in thickness from the perimeter wall towards a centerline axis of the low-reactivity cup, wherein the first quantity of diamond grains are distributed into the low-reactivity cup by subjecting the first quantity of diamond grains to centripetal acceleration;
    positioning a second quantity of diamond grains having a second characteristic property that differs from the first characteristic property in the low-reactivity cup, the second quantity of diamond grains be positioned to at least partially contact the perimeter wall of the low-reactivity cup and to at least partially contact the first quantity of diamond grains; and
    subjecting the low-reactivity cup, the first quantity of diamond grains, and the second quantity of diamond grains to a HPHT process in which adjacent diamond grains are sintered to one another and form diamond-to-diamond bonds.

14. The method of claim 13, wherein the low-reactivity cup is rotated as the first quantity of diamond grains are distributed into the low-reactivity cup.

15. The method of claim 13, wherein the second quantity of diamond grains are distributed into the low-reactivity cup without the second quantity of diamond grains being subjected to centripetal acceleration.

* * * * *